Nov. 22, 1955
A. K. GILKEY
2,724,182
DIP AND SLOPE INDICATOR
Filed Jan. 5, 1952
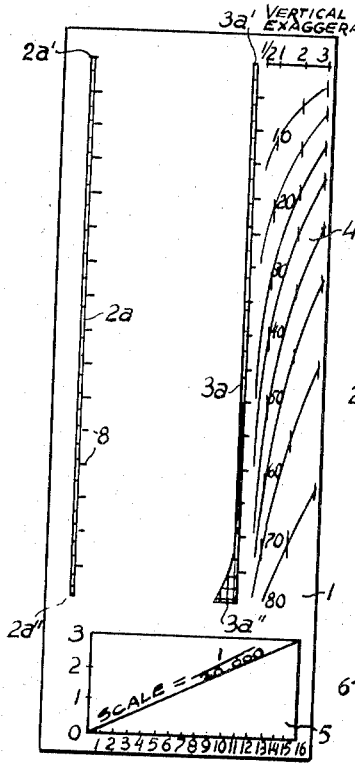
FIG. 2
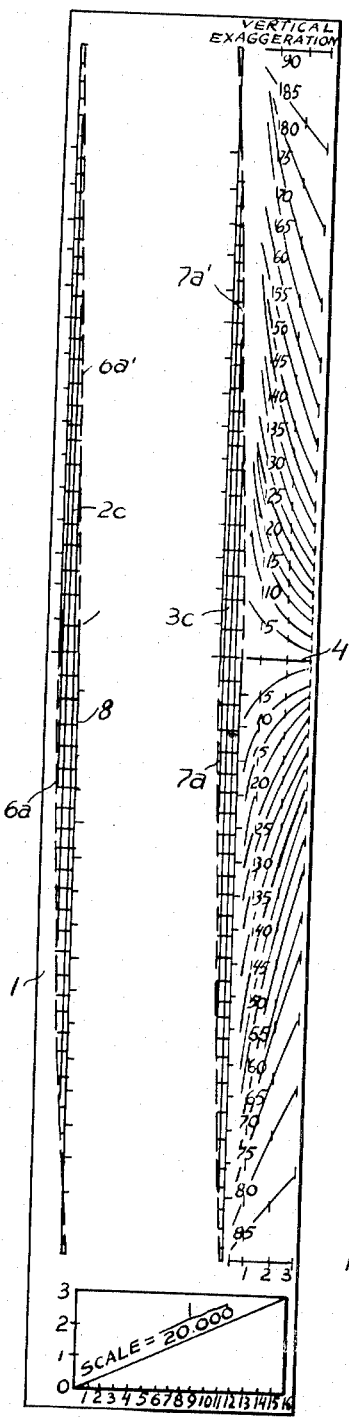
FIG. 4
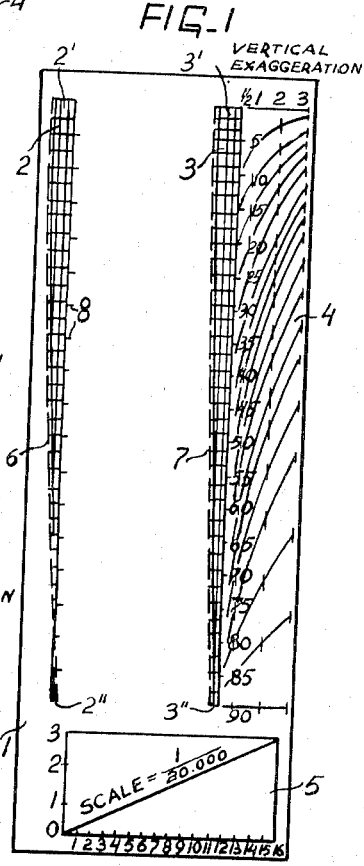
FIG. 1
Legend:
Broken Line
shows RED color
FIG. 3
INVENTOR:
Arthur H. Gilkey
A. John Michel
BY ATTORNEY

United States Patent Office 2,724,182
Patented Nov. 22, 1955

2,724,182

DIP AND SLOPE INDICATOR

Arthur K. Gilkey, Ames, Iowa

Application January 5, 1952, Serial No. 265,103

9 Claims. (Cl. 33—1)

This invention relates to improvements in instruments used in photogrammetry, and more particularly to an instrument for measuring topographic slopes and geologic dips from stereoscopically viewed pairs of air photographs.

When two overlapping aerial photographs are oriented under a stereoscope one sees a stereoscopic model of the ground in which each object is a fused image of two photographic images, one of which appears on the left photograph and the other of which appears on the right photograph. The apparent height of the fused image is a function of the measured distance between the like images on the two photographs.

Previously known instruments for measuring the relative heights on aerial photographs have made use of the "floating dot" principle, i. e. the principle that two dots spaced at different intervals give the stereoscopic illusion of a single dot at various elevations. In contrast to these known devices, the present invention depends on the "inclined plane" principle, i. e. the stereoscopic illusion of two tapered strips forming a single ribbon of continuously varying inclination.

The principal object of this invention is to provide a simple device capable of determining the degree of inclination of dips and slopes on a pair of stereoscopically viewed air photographs of known scale and overlap directly, and without any reference to mathematical formulas.

The above and other objects and advantages may be obtained by the device illustrated on the accompanying drawing in which:

Fig. 1 illustrates a transparent plate or sheet comprising one embodiment of the device according to my invention;

Fig. 2 shows a similar device with the markers being tapered in opposite directions;

Fig. 3 shows a similar device with one marker being untapered; and

Fig. 4 shows an indicator with the markers tapered toward both ends.

My instrument operates on the "inclined plane" principle, i. e. that the illusion of one inclined plane is produced stereoscopically by presenting spaced-apart areas of dissimilar width to the eyes. When the widths are equal, a horizontal plane is represented, and when the widths differ considerably, a steeply inclined plane is seen. Thus, the indicator of the present invention comprises, essentially, a transparent plate or sheet adapted to be placed upon aerial photographs, two elongated and tapered markers arranged on said plate or sheet in spaced relationship to each other, and a reference scale adjacent one or both of said markers to determine the angle of inclination. If the two markers are of equal width at the one end but of unequal taper toward the other, so that a discrepancy in widths appears increasingly toward the other end, a continuous range of inclinations from horizontal to steeply inclined is perceived, the inclination depending upon the discrepancy in width between said tapered markers.

Like reference numerals designate the same parts in all figures of the drawing. In the embodiment shown in Fig. 1 of accompanying drawing, my device consists of a transparent plastic plate 1 on which are arranged two opaque, tapered markers 2 and 3 of equal width at one end 2' and 3', respectively, and of increasingly differing width toward the other end 2" and 3", respectively, the two markers combining to give the illusion of a single ribbon of varying inclination when viewed stereoscopically. Along the outer edge of at least one of the markers is a graduated scale 4 showing the angle of inclination of the observed dip or slope in degrees, said scale being calibrated according to the vertical exaggeration of air photographs observed. The vertical exaggeration may be determined from a separate graph 5 described hereinafter. As illustrated, this graph is arranged on the same plate as the indicator. However, if desired, the graph may be provided on another plate or sheet. The instrument may be turned either way to give slopes in opposite directions.

The taper of the two markers may run in the same direction or in opposite directions. The markers may be formed by paper tapes, etching, paint, photographic means, or in any other desired manner producing opaque areas. If desired, the markers and/or the scales and graph may be sandwiched between two transparent sheets or plates to protect them from wear.

In the embodiments shown in Figs. 2 and 3, a small range near the perpendicular is not represented. This range includes those angles nearer to perpendicular than one half the angle normally subtended by the two eyes at a viewing distance equal to the image distance of the stereoscope. This small range of angles may be unimportant if the vertical exaggerations are not too great. In Fig. 2, marker 2a is slightly tapered from end 2a' toward end 2a", while marker 3a is tapered in the opposite direction, from 3a" to 3a'. In Fig. 3, marker 3b is untapered while marker 2b is tapered from end 2b' to 2b". However, if desired (see Fig. 1), it is possible to add a portion to both markers in which the narrower marker 2 goes to zero and then widens until both reach the same width, and, at the same time, to make one edge 6, 7 of both markers distinctive by the addition of, say, an inked line, or a colored line, or dots, or markers of various shapes along that edge. This distinctive edge, a red line being illustrated is on the same side for the entire length of the wider tape 3, while the distinctive edge of the narrower marker 2 changes sides at the point where its thickness is zero. This arrangement gives a stereoscopic illusion of one inclined plane which steepens all the way to the perpendicular. In Fig. 4, markers 2c and 3c are tapered towards both ends. As shown, the lower halves of markers 2c and 3c are the same as markers 2 and 3 of Fig. 1, the upper halves of each marker constituting mirror images of the lower halves of the other marker. Red edge lines 6a, 6a' and 7a, 7a' are provided on the markers similarly to Fig. 1.

To assist the illusion of a "twisted ribbon," an additional feature is desirable: the width of both markers should be gradually reduced, from a maximum at the end where they appear horizontal to a minimum at the end where they appear steeply inclined. This is desirable to make the two images small enough for the eyes to fuse easily as they become less equal in width, and is especially imoprtant at the "vertical" end where the distinctive edges are on opposite sides. An accompanying effect is that the marker then appears to maintain a more nearly uniform width, i. e. a uniform slant height. The marker widths of Figs. 1 and 4 have been computed so as to provide constant slant height. The marker widths in these cases vary as a cosine function of the inclination, the phase of the narrow marker leading that of the wider by a small constant angle. Figures for these widths are given in Example I. A close approximation to constant slant height can be achieved by linear diminution of one tape, and figures for such a case are provided in Example II, as an alternative to Example I.

If desired, both markers may be tapered linearly. This results, however, in a non-constant rate of change of inclination; a constant rate of change of inclination, as shown in all figures, is of most general usefulness, but any desired manner of change may be employed.

If desired, the length of the indicator could be doubled and the markers could be duplicated on the second half in reverse, forming a reversed image of the first pair of markers. Such a device would make it unnecessary to turn the indicator around to produce slopes in the opposite direction (Fig. 4).

In any of the above-described embodiments of my indicator, the tapered markers could be serrated to give the effect of mountains of various inclinations, perhaps with the point of each peak indicating a scale division. This serves two purposes: first, to assist the observer in fusing the images and second, to provide a "distinctive edge," obviating the inked line referred to above.

On all the figures shown, small dashes 8 are provided to assist fusion of corresponding parts of the two markers.

If the indicator is to be used in conjunction with a mirror-type stereoscope, in which instance the spacing between corresponding points on the photographs is of the order of a foot instead of two inches, it is desirable to divide the transparent sheet or plate into two strips, each carrying one marker, the two strips being, for instance, connected by a cross member of the proper length. For convenience, these strips may be hinged so that the instrument folds into a single strip when not in use.

To allow for individual viewing habits, the distance between the two longitudinal markers of the indicator could be made adjustable. No change in the scale nor in the graph would be necessitated by such a modification. The provision of such adjustment is not essential, however. In use, if the distance between the marks is fixed, this distance is matched to the spacing of the photographs by moving the photographs closer together or farther apart which results in the stereoscopic illusion of changing the "inclined plane's" apparent height above the topography. When the distance of the photographs is correctly adjusted, the "inclined plane" will appear to rest directly on the slope being considered. If the distance between the marks is made adjustable, that distance is varied until the same effect is obtained.

Following are some examples of my indicator as actually calculated. However, it will be clearly understood that these examples are given by way of illustration only and are in no way limiting the scope of my invention.

*Example I*

As shown in Fig. 1, the thinner of the two markers diminishes sinusoidally from 0.3000" at the top to 0.0000 at a point near the opposite end (82.73 degrees), and then widens, still sinusoidally, to 0.03826" at the bottom. The taper of the thicker marker varies sinusoidally from 0.3000" at the top to a maximum (0.3024" at 7.267°) and then diminishes sinusoidally to 0.03826" at the bottom.

| Degrees of Inclination (Vert. Exaggeration=1) | Width of Thinner Tape in Inches | Width of Thicker Tape in Inches |
| --- | --- | --- |
| 0 | 0.3000 | 0.3000 |
| 5 | 0.2958 | 0.3022 |
| 10 | 0.2888 | 0.3022 |
| 15 | 0.2800 | 0.2999 |
| 20 | 0.2686 | 0.2948 |
| 25 | 0.2558 | 0.2878 |
| 30 | 0.2408 | 0.2792 |
| 35 | 0.2238 | 0.2740 |
| 40 | 0.2052 | 0.2544 |
| 45 | 0.1851 | 0.2394 |
| 50 | 0.1637 | 0.2222 |
| 55 | 0.1409 | 0.2036 |
| 60 | 0.1169 | 0.1830 |
| 65 | 0.09210 | 0.1617 |
| 70 | 0.06670 | 0.1387 |
| 75 | 0.04070 | 0.1146 |
| 80 | 0.01442 | 0.0899 |
| 85 | 0.01196 | 0.06425 |
| 90 | 0.03826 | 0.03826 |

The curves of the degree scale to the right of the thicker marker are plotted according to the following calculation, the points under Vertical exaggeration=1 being equally spaced by dividing the marker into nine equal parts. The remaining points occur at the following degree readings, again referring to Vertical exaggeration=1.

| Degrees of Inclination (Vert. Exaggeration=1) | Positions in terms of Vert. Exag.=1 for same inclinations but other exaggerations | | |
| --- | --- | --- | --- |
| | 0.5 | 2.0 | 3.0 |
| 0 | 0 | 0 | 0 |
| 5 | 9.9 | 2.5 | 1.7 |
| 10 | 19.4 | 5.1 | 3.4 |
| 15 | 28.2 | 7.6 | 5.1 |
| 20 | 36.1 | 10.3 | 6.9 |
| 25 | 43.0 | 13.1 | 8.8 |
| 30 | 49.1 | 16.1 | 10.9 |
| 35 | 54.5 | 19.3 | 13.1 |
| 40 | 59.2 | 22.8 | 15.6 |
| 45 | 63.4 | 26.6 | 18.4 |
| 50 | 67.2 | 30.8 | 21.7 |
| 55 | 70.7 | 35.5 | 25.5 |
| 60 | 73.9 | 40.9 | 30.0 |
| 65 | 76.9 | 47.0 | 35.6 |
| 70 | 79.7 | 53.9 | 42.5 |
| 75 | 82.4 | 61.8 | 51.2 |
| 80 | 85.0 | 70.6 | 62.1 |
| 85 | 87.5 | 80.1 | 75.3 |
| 90 | 90.0 | 90.0 | 90.0 |

*Example II*

As an alternative shape for the markers of Example I, the thinner of the two markers may be tapered linearly from 0.3000" at the top to 0.0000" (at 82.73°) to 0.02634" at the bottom. The wider marker varies somewhat from a linear taper, its curve being plotted according to the following calculation:

| Degrees of Inclination (Vert. Exaggeration=1) | Width of Thinner Tape in Inches | Width of Thicker Tape in Inches |
| --- | --- | --- |
| 0 | 0.3000 | 0.3000 |
| 5 | 0.2819 | 0.2880 |
| 10 | 0.2637 | 0.2756 |
| 15 | 0.2456 | 0.2650 |
| 20 | 0.2275 | 0.2496 |
| 25 | 0.2094 | 0.2356 |
| 30 | 0.1912 | 0.2216 |
| 35 | 0.1731 | 0.2120 |
| 40 | 0.1550 | 0.1921 |
| 45 | 0.1368 | 0.1768 |
| 50 | 0.1187 | 0.1611 |
| 55 | 0.1006 | 0.1453 |
| 60 | 0.08224 | 0.1291 |
| 65 | 0.06431 | 0.1128 |
| 70 | 0.04618 | 0.0960 |
| 75 | 0.02805 | 0.07895 |
| 80 | 0.00992 | 0.06180 |
| 85 | 0.00821 | 0.04415 |
| 90 | 0.02634 | 0.02634 |

Example III

As shown in Fig. 2, the thinner marker diminishes linearly from 0.0868″ at the top to 0.0592″ at the bottom (80°), while the wider marker increases non-linearly according to the following values (computed only at 10° intervals, for brevity):

| Degrees of Inclination (Vert. Exaggeration=1) | Width of Thinner Tape in Inches | Width of Thicker Tape in Inches |
|---|---|---|
| 0 | 0.0868 | 0.0868 |
| 10 | 0.0834 | 0.0872 |
| 20 | 0.0799 | 0.0877 |
| 30 | 0.0764 | 0.0856 |
| 40 | 0.0730 | 0.0906 |
| 50 | 0.0696 | 0.0944 |
| 60 | 0.0661 | 0.1036 |
| 70 | 0.0626 | 0.1302 |
| 80 | 0.0592 | 0.3684 |

Example IV

As shown in Fig. 3, the wider marker maintains a constant width, while the thinner marker decreases non-linearly according to the following values (computed at only 10° intervals, for brevity):

| Degrees of Inclination (Vert. Exaggeration=1) | Width of Thinner Tape in Inches | Width of Thicker Tape in Inches |
|---|---|---|
| 0 | 0.3000 | 0.3000 |
| 10 | 0.2868 | 0.3000 |
| 20 | 0.2736 | 0.3000 |
| 30 | 0.2586 | 0.3000 |
| 40 | 0.2418 | 0.3000 |
| 50 | 0.2208 | 0.3000 |
| 60 | 0.1915 | 0.3000 |
| 70 | 0.1443 | 0.3000 |
| 80 | 0.0482 | 0.3000 |

The instrument, shown in its simplest form, is usable with lens-type stereoscopes; if the image distance of the instrument used differs noticeably from that of a common lens stereoscope, slightly different scales would have to be provided. Simple modifications adapt it for use with prism-type stereoscopes. It can be designed for use with air photographs of any scale, the embodiment shown being suited for those of Representative fraction= 1:20,000. If it is to be used with air photographs of several different scales, it is only necessary to add an additional curve to the graph for each additional scale.

In use, the transparent indicator is laid upon a pair of air photographs being viewed stereoscopically, with the tapered markers pointing away from the observer. This will result in the illusion of a single ribbon, which will appear to be horizontal at the end where both markers are of the same width and nearly vertical at the other end. The slope being considered is simply matched to whichever portion of the ribbon has a similar inclination, and the value of that inclination is read off the corresponding point of the scale alongside the ribbon. Inasmuch as the way in which the air photographs are taken causes the slopes to appear somewhat differently inclined than in nature, the scale is calibrated to correct for this vertical distortion, and a special graph 5 is provided so the user can determine the value of vertical exaggeration, knowing the scale of his photos and the distance by which they overlap. On the graph, the vertically arranged numerals show the vertical exaggeration while the horizontally arranged numerals indicate the distance between the center points of photos in thousands of feet. By way of example, if the distance between the center points of the air photos to be observed is 10,000 feet, the vertical exaggeration on our scale is nearly 2 and the inclination of the slope observed will be read alongside the tapered ribbon under 2.

The user first notes (1) the scale of his photographs, and (2) the ground distance between the center of one photograph and that point on the same photograph which shows the ground location occurring at the center of the other photograph. Knowing the scale of the photographs he can determine the distance between the center points of both photographs and read the corresponding vertical exaggeration from the graph which is preferably arranged on the same instrument. The pair of air photographs is then viewed stereoscopically, and the instrument is laid upon them. The photographs are moved slightly more together or apart until the ribbon which is perceived appears to lie directly upon the topography being observed, i. e. neither above nor below it, or, if an embodiment having the marks an adjustable distance apart is being used, the marks are moved nearer together or farther apart until the same effect is perceived. The portion of the ribbon duplicating the slope is chosen and the point on the scale opposite it and under the proper value of vertical exaggeration is read, this being the desired answer.

Having thus described my invention, what I claim is:

1. In combination with a pair of stereoscopically viewed aerial photographs, a transparent dip and slope indicator superimposed upon said photographs and comprising two elongated markers arranged in spaced relationship, at least one of said markers being tapered, and a scale associated with at least one of said markers indicating the angle of inclination to be determined.

2. In combination with a pair of stereoscopically viewed aerial photographs, a transparent dip and slope indicator superimposed upon said photographs and comprising two elongated markers of equal length arranged in spaced and parallel relationship, one of said markers being tapered and the other marker being substantially rectangular, and a scale associated with at least one of said markers indicating the angle of inclination to be determined.

3. In combination with a pair of stereoscopically viewed aerial photographs, a transparent dip and slope indicator superimposed upon said photographs and comprising two tapered elongated markers arranged in spaced and substantially parallel relationship, and a scale associated with at least one of said markers, said scale being calibrated to show the angle of inclination of a photographed slope.

4. The combination defined in claim 3, comprising a graph carrying indicia for different vertical exaggerations, said scale being calibrated to show the angle of inclination of the photographed slope under different vertical exaggerations.

5. The combination defined in claim 3, wherein the two markers are tapered in the same direction.

6. The combination defined in claim 3, wherein the two markers are tapered in opposite directions.

7. The combination defined in claim 3, wherein one of said markers has the form of a wedge bounded by two straight lines and the other marker is bounded by one straight and one curved line.

8. In combination with a pair of stereoscopically viewed aerial photographs, a transparent dip and slope indicator superimposed upon said photographs and comprising two elongated markers of equal length arranged in spaced and substantially parallel relationship, the two markers being tapered from the centers toward their respective ends, and a scale associated with at least one of said markers indicating the angle of inclination to be determined.

9. The method of measuring the relative heights of dips and slopes on aerial photographs, comprising the steps of orienting two overlapping aerial photographs under a stereoscope to obtain a stereoscopic model of the ground, superposing a transparent member having two elongated markers, at least one of which is tapered, upon said aerial photographs, the two markers forming the stereoscopic illusion of a single ribbon of continuously varying inclination, placing the stereoscopically viewed ribbon of varying inclination upon the topography being observed, selecting the portion of the ribbon which duplicates the slope, and obtaining the relative height by obtaining the value from a scale arranged next to said ribbon and indicating the angle of inclination to be determined.

References Cited in the file of this patent

UNITED STATES PATENTS

| | | |
|---|---|---|
| 819,370 | Noacre | May 1, 1906 |
| 2,376,811 | Rigby | May 22, 1945 |
| 2,428,435 | Schlatter | Oct. 7, 1947 |